US008112576B2

(12) United States Patent
Shkidt et al.

(10) Patent No.: US 8,112,576 B2
(45) Date of Patent: Feb. 7, 2012

(54) CALIBRATED TRANSFER RATE (75) Inventors: Alexei Shkidt, Newark, CA (US); Aysel Yildiz Okyay, Istanbul (TR); Gregory Jon Richmond, Cupertino, CA (US)

(73) Assignee: Silicon Labs Spectra, Inc., Sunnyvale, CA (US)

( * ) Notice: Subject to any disclaimer, the term of this patent is extended or adjusted under 35 U.S.C. 154(b) by 341 days.

(21) Appl. No.: 12/421,682

(22) Filed: Apr. 10, 2009

(65) Prior Publication Data

US 2009/0259804 A1    Oct. 15, 2009

Related U.S. Application Data (60) Provisional application No. 61/044,007, filed on Apr. 10, 2008.

(51) Int. Cl.
 G06F 13/38    (2006.01)
(52) U.S. Cl. ............ 711/103; 711/154; 710/14; 710/33; 331/44

(58) Field of Classification Search .................... 331/44, 331/1 R, 16, 108 C, 108 D, 177 R; 711/100, 711/102, 103, 154, 167, E12.002, E12.008; 710/5, 6, 20, 21, 22, 25, 33, 35, 58, 60, 14, 710/8, 10, 74; 326/38; 709/233
See application file for complete search history.

(56) References Cited

U.S. PATENT DOCUMENTS

| 7,461,182 | B2 * | 12/2008 | Fukushima et al. ............ 710/33 |
| 7,549,033 | B2 * | 6/2009 | Choi et al. .................... 711/167 |
| 7,876,124 | B2 * | 1/2011 | Okyay et al. ................... 326/38 |
| 2005/0068118 | A1 * | 3/2005 | Hein ............................ 331/158 |

* cited by examiner

Primary Examiner — Ryan Johnson
(74) Attorney, Agent, or Firm — Zagorin O'Brien Graham LLP (57) ABSTRACT Methods, systems, and devices are described for the implementation of a novel architecture to support a calibrated rate for the transfer of circuit configuration data. Sets of configuration data from a memory may be transferred to volatile memory to support reconfigurable circuit elements, for example, for use in a clock generator. Upon system power-up, there may be a default speed for the transfer of the configuration data. Techniques are described to first transfer calibration data upon power-up; the transferred calibration data may then be used to set an accelerated speed for a remaining portion of the transfer.

23 Claims, 8 Drawing Sheets

CALIBRATED TRANSFER RATE

CROSS-REFERENCES TO RELATED APPLICATIONS

This application claims priority from U.S. Provisional Patent Application No. 61/044,007, filed Apr. 10, 2008, entitled "CALIBRATED DOWNLOAD RATE" which is hereby incorporated by reference, as if set forth in full in this document, for all purposes.

BACKGROUND

Embodiments of the present invention relate to integrated circuits in general and, in particular, to a calibrated transfer rate for circuit configuration data. One of the success factors in the design and development of integrated circuits is the ability to adapt to new functional requirements in next generation electronic products. Traditional ways to reduce the time taken to introduce new products is to increase the available development resources and subdivide tasks to perform them in parallel. Additionally, circuits can be designed so that they can be reconfigured quickly. Successful reconfigurable architectures include masked ROM, gate-arrays, and analog arrays where logic, memory content, or analog building block interconnects and attributes can be changed by modifying a subset of the normal process layers, typically in the metal interconnect layers.

The introduction of nonvolatile programming technology such as electrically programmable read-only memory (EPROM), electrically erasable programmable read-only memory (EEPROM), and one-time-programmable (OTP) antifuse have allowed this type of reconfiguration to be done through electrical programming rather than through wafer fabrication that may require reticle changes for implementation. When using electrical programming technology to change circuitry, it may be beneficial to have configuration information available in near "real time" fashion and at many different control or reconfiguration points within a circuit. Memory support circuits, such as data busses, address decoders, sense amplifiers, and high voltage control circuits, may be used in proximity to the respective die locations in order to support every bit used in circuit configuration. Therefore, the nonvolatile memory "bit" information is sometimes stored in multiple locations throughout the semiconductor die, which may lead to an inefficient nonvolatile memory structure.

In light of the foregoing, it may be desirable to have an architecture where some configuration data is stored in a more centralized memory and distributed upon power-up. Moreover, it may be desirable to identify novel techniques in which the configuration data is distributed more quickly and/or efficiently during system power-up.

SUMMARY

Devices, systems, and methods are described for the implementation of a novel architecture to support techniques for transferring circuit configuration data. Sets of configuration data from a memory may be transferred to volatile memory on power-up to support reconfigurable circuit elements. There may be a default speed for the transfer of the configuration data upon power-up. Techniques are described to accelerate the data transfer speed by first transferring calibration data upon power-up; this transferred calibration data may then be used to set an accelerated speed. Such functionality may allow the download sequence to configure all clock elements and attain stable operation of the clock system more quickly.

For a clock generator, having selected circuit elements reach a stable operation state quickly may be desirable during power-up. In one embodiment, components of such a clock generator are described. Calibration data and configuration data may be maintained in nonvolatile memory. The calibration data may identify an accelerated operational frequency to be used for the transfer of configuration data. During power-up, the separate nonvolatile memory may transfer the calibration data to volatile memory (e.g., speed control registers) using a default frequency. A control module may access the calibration data from volatile memory, and control the internal oscillator to accelerate from the default frequency to an accelerated operational frequency according to the accessed calibration data. Thus, the internal oscillator may operate at the default frequency for the transfer of the calibration data identifying the accelerated operational frequency, then operate at the accelerated operational frequency for transfer of additional configuration data. The circuit elements of a clock generator may contain configurable elements programmed by this transferred configuration data.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, devices, and methods are described for controlling the transfer of data for the configuration of circuit elements. Techniques directed to calibrating the transfer speed of configuration data from memory at system start-up are described. Clock generators and other components may contain configurable circuit elements programmed by data provided in volatile storage elements. In some embodiments, during power-up, a separate nonvolatile memory may transfer configuration data to the volatile memory to initiate and control the operation of the configurable elements. There may be a default speed for the transfer of such configuration data. Techniques are described to first transfer calibration data upon power-up; the transferred calibration data may then be used to set an accelerated speed for a remaining portion of the transfer.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

As noted above, an alternative to a conventional use of nonvolatile programming technology is to make available a dense, nonvolatile memory array within a circuit. Nonvolatile memory contents may be downloaded to volatile control registers after a sufficient voltage exists for the volatile control registers to retain the configuration data. Achieving this minimum operating voltage level is commonly referred to as circuit power-up. A programmable clock circuit power-up time may typically be, for example, 3-10 milliseconds (ms). After circuit power-up is achieved, the download sequence from nonvolatile memory to volatile memory can begin. Once a system powers-up, it may be desirable for functionality to be achieved as soon as possible. Minimizing power-up time may be desirable for clock generators which serve as the heart of a system and must themselves become stable before the rest of the system is allowed to begin functioning. When the clock frequency is not stable when the system is enabled, errors may occur.

In some embodiments, techniques directed to controlling the transfer speed of configuration data from memory at system power-up are described. More particularly, methods and techniques are described for using both nonvolatile memory arrays and volatile memory to store configuration data for a set of circuit elements. In some embodiments, these circuit elements are described for a clock generator, although many embodiments of the invention are not limited to clock generators. By way of example, some embodiments are generally directed to system initialization for a clock generator where calibration data is stored in the nonvolatile memory array. The calibration data may be transferred first, such that configuration data for various configurable clock elements is transferred at an accelerated speed to initiate ramp-up processes and progress toward stable operation in a predetermined sequence.

Figure 1A:
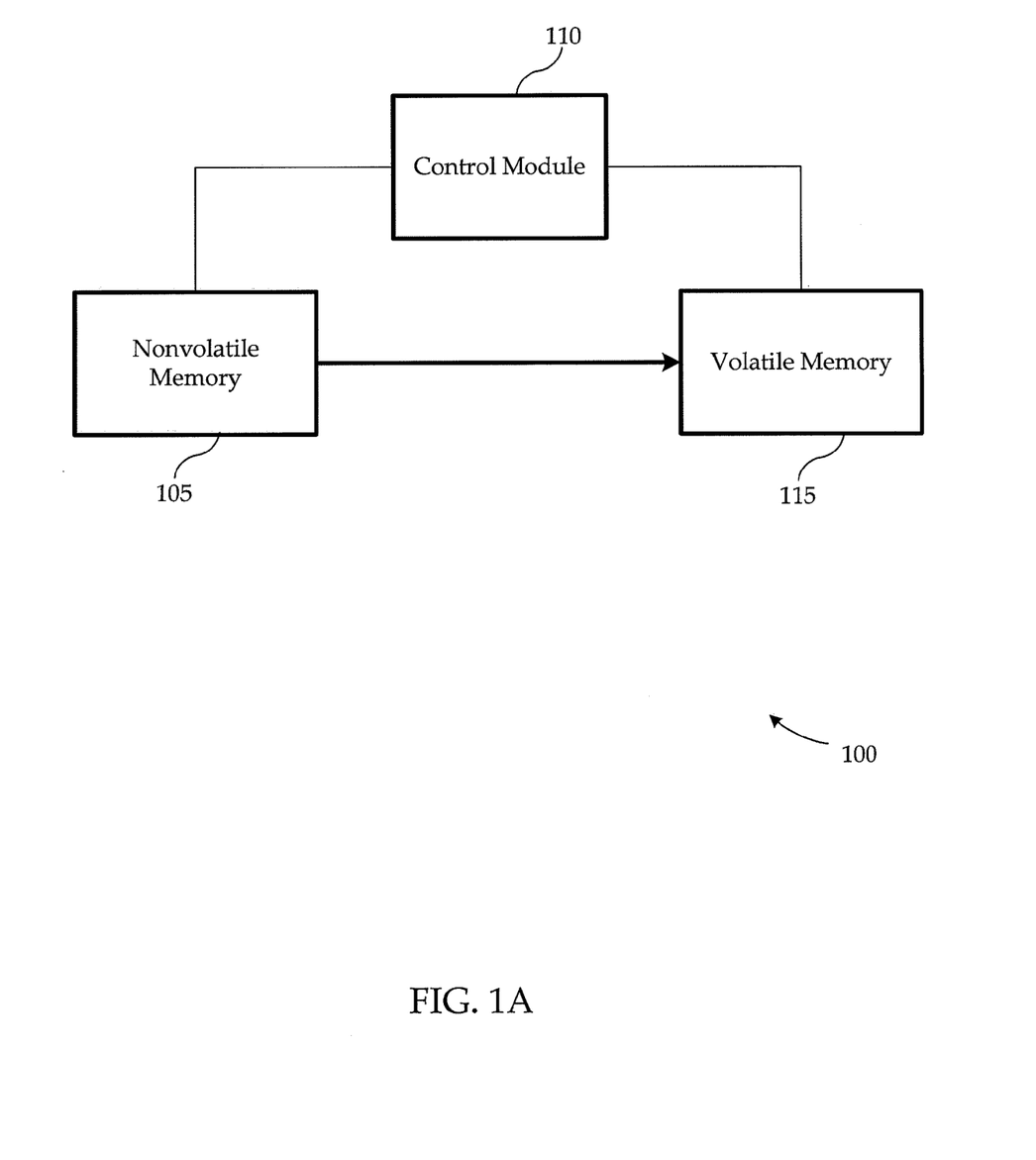
FIGS. 1A and 1B are block diagrams illustrating generalized aspects of a circuit configuration architecture configured according to various embodiments of the invention.

Referring first to FIG. 1A, a block diagram is shown illustrating an example configuration 100 made up of aspects of a circuit configuration architecture according to various embodiments of the invention. This configuration 100 may be a configuration circuit, may be integrated into a clock generator architecture, or may be utilized for configuration of a number of different types of circuits. The configuration 100 includes a nonvolatile memory 105, a control module 110, and volatile memory 115, each of which may be in communication with the other.

The nonvolatile memory 105 may be an array configured to store a set of configuration data for each of a number of circuit elements. The nonvolatile memory 105 also includes transfer speed control data corresponding to an accelerated speed. Nonvolatile memory 105 includes memory that retains stored information even when not powered. Examples of non-volatile memory include read-only memory (ROM), electrically programmable read-only memory (EPROM), electrically erasable programmable read-only memory (EEPROM), and one-time-programmable (OTP) antifuse, and flash memory.

The control module 110, in communication with the nonvolatile memory 105 and the volatile memory 115, may be configured to control the transfer speed of successive transfers of configuration data from the nonvolatile memory 105 to the volatile memory 115. In one embodiment, the control module 110 may commence predetermined sequence of transfers with a set of the transfer speed control data from the nonvolatile memory 105 to the volatile memory 115. The control module 110 may control the transfer of this data at a default speed. This default speed may be set by transfer speed control data existing in the volatile memory 115 upon system power-up and before the transfer of the set of transfer speed control data corresponding to the accelerated speed. After transfer of the set of speed control data, the control module 110 may access the set of transfer speed control data from the volatile memory 115 to identify an accelerated second speed. The control module 110 may then control transfer, at the accelerated second speed, of at least a portion of the remaining configuration data.

The transfer of the configuration data for the remaining circuit elements may occur at the accelerated speed identified by the transfer speed control data, and may occur sequentially. In one embodiment, power supply configuration data may be transferred first. Because of the sequential nature of the transfers, the operation of the power supply for other circuit elements may be initiated upon completion of the transfer of the set of configuration data corresponding to a power supply, even as the transfer of the configuration data for the system timing circuit is ongoing. The transfer of the set of configuration data for the system timing circuit may also occur sequentially. The transfer sequence related to the system timing circuit may begin with the transfer of a first subset of configuration data for a crystal oscillator (load capacitances), then transfer a second subset of configuration data for analog PLL parameters (e.g., programming loop filters, charge pump currents, VCO range, gain, and offset), then transfer a third subset of configuration data for digital PLL parameters (e.g., programming specific digital divider values). The operation of the crystal oscillator, analog PLL components, and digital PLL parameters may be initiated as each respective set of configuration data is received. Thus, operation may be initiated for certain system timing circuit elements (e.g., the analog PLL components) even as the transfer of the configuration data for the digital PLL parameters is ongoing. All, or a subset, of these transfers may occur at the accelerated speed.

After transfer of the set of configuration data corresponding to the system timing circuit, the control module 110 may then control transfer of an additional set of configuration data corresponding to one or more system input/output (I/O) circuits. For each such I/O circuit, the configuration parameters may include, for example: I/O type (input, output, bi-directional), drive strength, output types, output skew, and input/output polarity.

Therefore, more generally, the control module 110 may transfer a set of configuration data for a second one of circuit elements after initiation of and concurrent with an operational state in a first of the circuit elements. The first circuit element may initiate operation upon receipt of corresponding configuration data. It is worth noting that the sequence of the transfer may be configurable via the control module 110. For example, the first transferred configuration data from the nonvolatile memory 105 may, in one embodiment, configure the control module 110 for a specific sequence or modify the sequence. Similarly, later transferred configuration data from the nonvolatile memory 105 may, in one embodiment, configure the control module 110 to change the speed for the transfer of certain configuration data. The control module 110 may be programmed in a number of different ways to otherwise modify the sequencing or transfer speed.

The control module 110 may be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

As noted above, the volatile memory 115 may be in communication with the nonvolatile memory 105 and the control module 110. The volatile memory 115 may be configured to receive the transfer speed control data and remaining configuration data from the nonvolatile memory 105 in the transfer sequence (either directly, or via the control module 110 or other interface) and store each transferred set of data. The volatile memory 115 includes memory that does not retain stored information when not powered. Volatile memory 115 may include dynamic random access memory (DRAM), static random access memory (SRAM), content addressable memory, dual-ported random access memory, and other forms of random access memory. In one embodiment, the volatile memory 115 is a volatile registers bank. The volatile memory may be configured to be in communication with each of the circuit elements (e.g., the configurable circuit of a clock generator), and make each set of configuration data accessible for the programming of the circuit elements as it is stored. The control module 110 may signal when each respective set has been successfully transferred so that the relevant programming elements may access the information even as additional transfers are in progress.

Figure 1B:
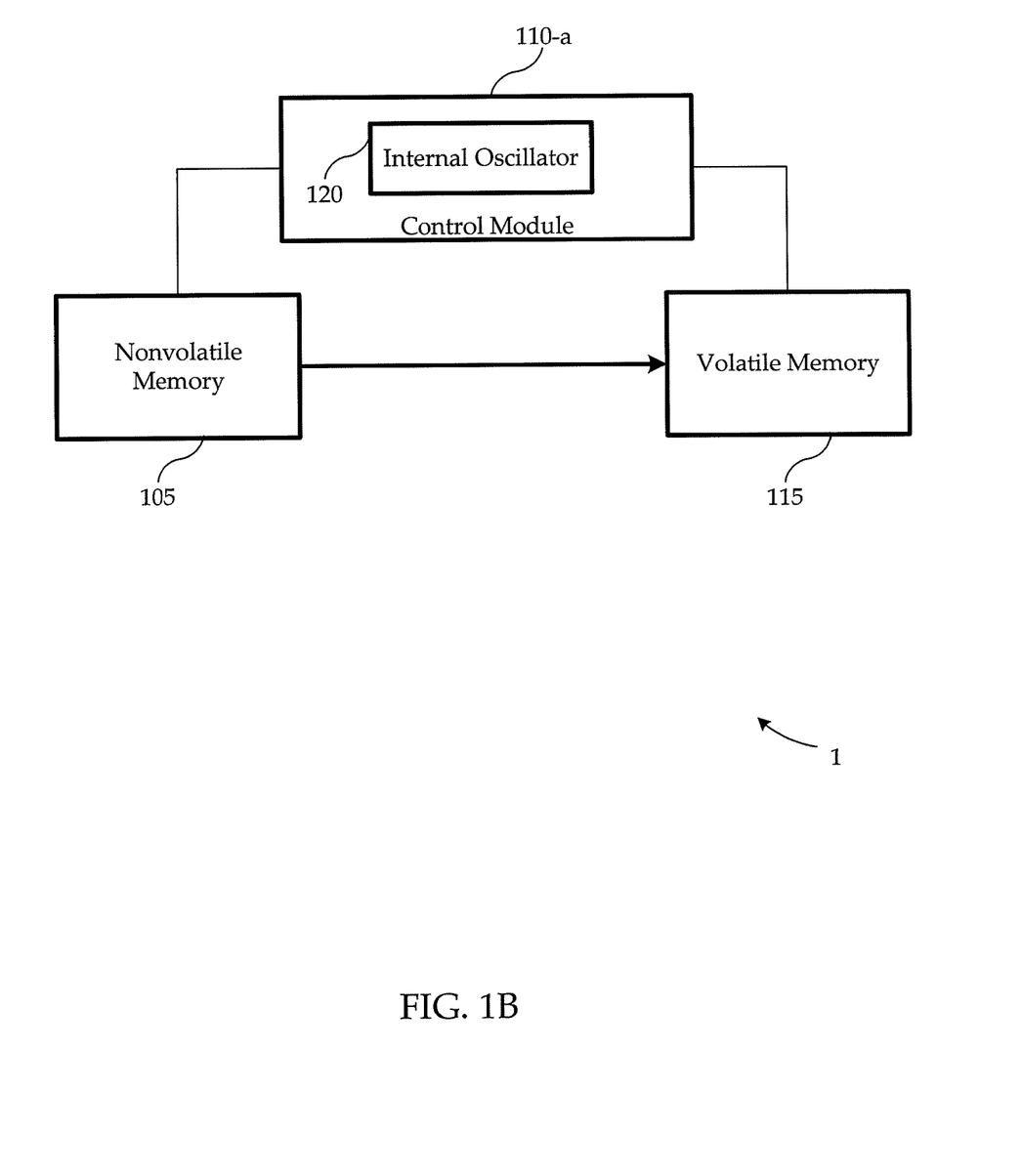

Referring next to FIG. 1B, a block diagram is shown illustrating an example configuration 150 made up of aspects of a circuit configuration architecture according to various embodiments of the invention. This may be the configuration 100 of FIG. 1A, and includes a nonvolatile memory 105 and volatile memory 115. The example configuration 150 also includes a control module 110-*a* which includes an internal oscillator 120. The control module 110-*a* relies on the internal oscillator 120 as its own state clock which in turn is used to run through the transfer process.

To ensure the maximum memory frequency is not violated at fast process corners, the oscillator frequency may be set by default to a lower frequency, typically 60% to 70% of the maximum memory read frequency. The maximum download time occurs at slow process corners, when the oscillator may be running at less than 50% of the maximum memory frequency. With such an architecture, it may be desirable to have a circuit and corresponding method of operation that would allow all the programming of the oscillator early in the power-up sequence. It may further be desirable to have the programming optimized in view of process variation and to have the programming values tailored to different implementations.

In one embodiment, the nonvolatile memory 105 is configured to store calibration data identifying an accelerated operational frequency to be used by the internal oscillator 120 for the transfer of data. The nonvolatile memory 105 may also store configuration data to program various circuit elements. The internal oscillator 120 may operate at the default frequency for the transfer of the calibration data from the nonvolatile memory 105 to the volatile memory 115. The control module 110-*a* may access the calibration data identifying the accelerated operational frequency from the speed control register, and control the internal oscillator 120 to accelerate from the default frequency to an accelerated operational frequency according to the accessed calibration data. The internal oscillator 120 may then operate at the accelerated operational frequency for the transfer of additional configuration data. It is worth noting that there may be one or more additional oscillators (not shown). Such oscillators may have their operational frequency set (e.g., via configuration data transferred to the volatile memory 115 at the accelerated speed) at different frequencies from the operational frequency for the internal oscillator.

There are a number of different methods that may be used to determine a calibration value to accelerate the frequency of the internal oscillator 120. For example, a calibration value may be extracted from a characterization process or production test of the chip containing the clock generator circuits. During a characterization process or production test, performance characteristics may be extracted. After analysis and application of an appropriate download frequency guard band (i.e., a reduction in speed to accommodate process variation as mentioned above), a calibration value reflecting an optimal download frequency may be determined.

Figure 2A:
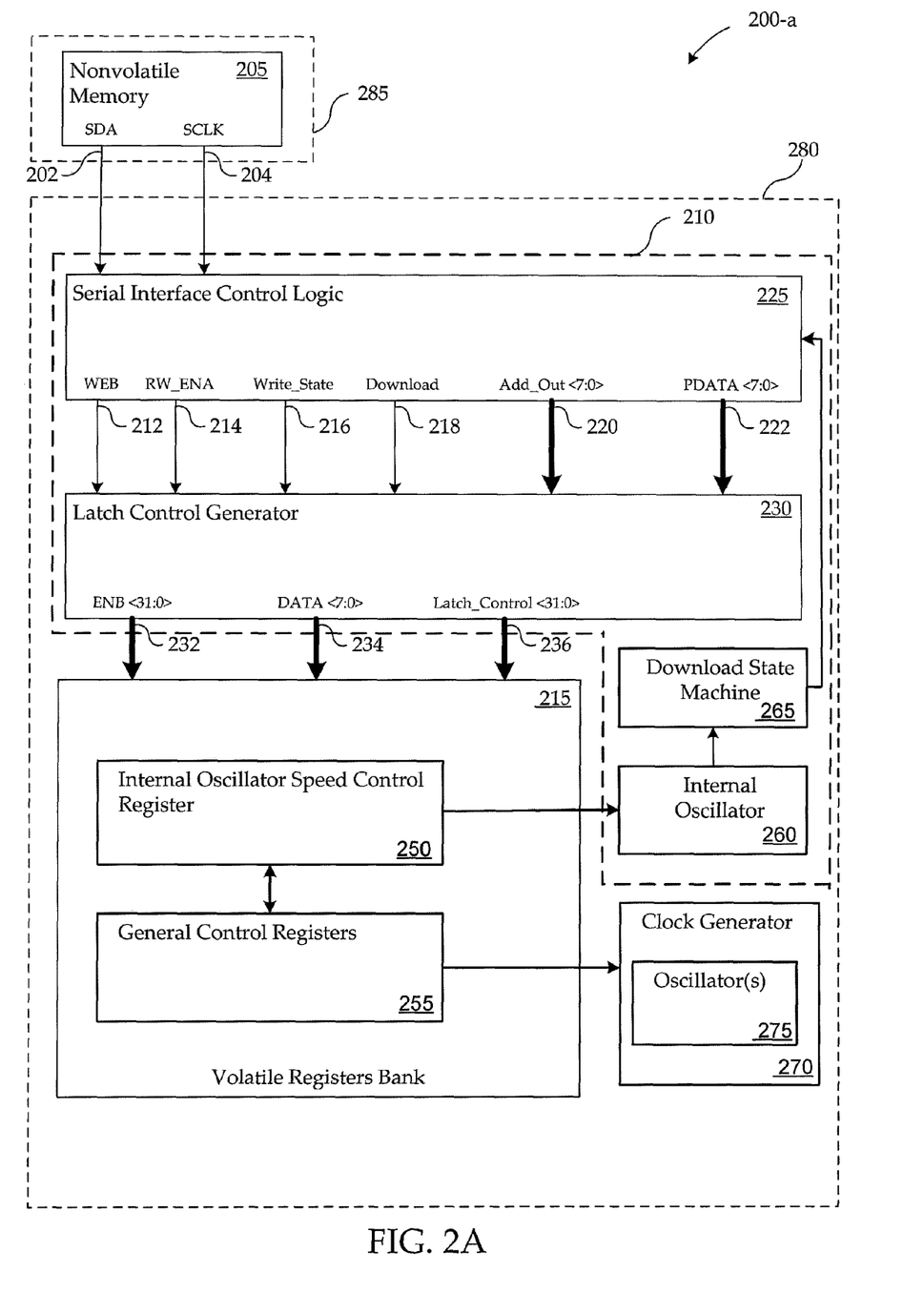
FIGS. 2A and 2B are block diagrams illustrating example circuit configuration architectures that calibrate a data transfer rate according to various embodiments of the present invention.

Turning next to FIG. 2A, a block diagram is shown illustrating an example circuit configuration 200-*a* that provides for sequenced and accelerated transfer of configuration data according to various embodiments of the present invention. A nonvolatile memory array 205 (which may be the nonvolatile memory 105 of FIG. 1A or 1B) is in communication with a serial interface control logic block 210. In the illustrated embodiment, the nonvolatile memory array 205 resides on a first semiconductor substrate 285 and the serial interface control logic block 225 and remaining circuitry reside on a second semiconductor substrate 280. The first semiconductor substrate 285 and the second semiconductor substrate 280 may be, for example, on a common packaging substrate (not shown) such as a multi-chip module (MCM) or in separate packages and coupled through a circuit board. To provide for communication to the serial interface control logic block 225, the nonvolatile memory array 205 has a serial-data (SDA) terminal 202 and a serial-clock (SCLK) terminal 204. A two wire serial protocol, such as the inter-integrated circuit (I2C) bus protocol, for example, may be implemented using the serial-data terminal 202 and the serial-clock terminal 204. The I2C bus protocol is an industry standard and is suitable for purposes of downloading clock configuration data.

The serial interface control logic block 225 may be in communication with a latch control generator block 230. To interface to the latch control generator block 230, the serial interface control logic block 225 provides a write-enable-bar (WEB) terminal 212, a read-write-enable (RW_ENA) terminal 214, a write-state (Write_State) terminal 216, a download (Download) terminal 218, an address-out (Add_Out <7:0>) bus 220, and a program-data (PDATA <7:0>) bus 222. The address-out bus 220 and the program-data bus 222 may be, for example, eight bits wide.

The circuit configuration 200-*a* also includes an internal oscillator 260, which may be the internal oscillator 120 of FIG. 1B. There is also a download state machine 265. The functionality of the internal oscillator 260 and download state machine 265 will be described in more detail below. The serial interface control logic block 225, latch control generator block 230, internal oscillator 260, and download state machine 265 may, in combination, make up a control module 210 (e.g., the control module 110 of FIG. 1A or 1B).

The latch control generator block 230 may be in communication with a volatile registers bank 215 through an enable-bar (ENB <31:0>) bus 232, a data (DATA <7:0>) bus 234, and a latch-control (Latch_Control <31:0>) bus 236. The enable-bar bus 232 and the latch-control bus 236 may be, for example, 32 bits wide; while the data bus 234 may be, for example, 8 bits wide.

The volatile registers bank 215 may be the volatile memory 115 of FIG. 1A or 1B. Speed control registers and configuration data registers, for receiving and retaining calibration data and circuit element configuration data, reside in the volatile registers bank 215. The volatile registers bank 215 may contain a power supply voltage regulator register, an analog PLL configuration register, a PLL divider and logic control register, an I/O configuration register, and a PLL spread spectrum register (not shown). The enable-bar bus 232, the data bus 234, and the latch-control bus 236 may connect the above configuration registers of the volatile registers bank 215 to the latch control generator block 230.

At a system start-up time, the serial interface control logic block 225 may commence operation by acquiring stored calibration data from the nonvolatile memory array 205. The serial interface control logic block 225 may then acquire configuration data from the nonvolatile memory array 205. The serial interface control logic block 225 may produce signaling on the serial-data terminal 202 and the serial-clock terminal 204 (e.g., I2C protocol signaling) that specifies to the nonvolatile memory array 205 which data to provide and the proper sequence.

Additionally, the serial interface control logic block 225 may produce address data on the address-out bus 220 along with appropriate latch directive signaling on the write-enable-bar terminal 212, the read-write-enable terminal 214, the write-state terminal 216, and the download terminal 218 to instruct the latch control generator block 230 how to generate latch control signaling. The latch directive signaling from the serial interface control logic block 225 allows the latch control generator block 230 to produce signaling on the enable-bar bus 232 to enable latches of the configuration registers within the volatile registers bank 215 which correspond to the set configuration data coming from the nonvolatile memory array 205. As the data to be transferred from the nonvolatile memory array 205 is acquired by the serial interface control logic block 225, the data is provided at the program-data bus 222 to the latch control generator block 230. The latch control generator block 230 in turn, produces the calibration data and then the configuration data at the data bus 234. The calibration data is provided to an internal oscillator speed control register 250, and the configuration data is provided to the appropriate general control registers 255 within the volatile registers bank 215. This functionality is performed as the latch control generator block 230 produces control signaling on the latch-control bus 236 along with the appropriate signals, mentioned previously, on the enable-bar bus 232 and, for example, one byte width of configuration data at a time on the data bus 234.

The transferred calibration data in the internal oscillator speed control register 250 is used to set an accelerated frequency for the internal oscillator 260. This internal oscillator 260 is used for the download state machine 265 as a state machine clock. In one embodiment, the download state machine 265 is implemented using logic gates (a digital synthesized design), although a range of alternative implementations may be used in other embodiments. Remaining configuration data from the nonvolatile memory 205 may be transferred to the general control registers 255 at the accelerated speed (based on the accelerated frequency in the internal oscillator 260). In one embodiment, the configuration data transferred at the accelerated speed may set the frequency at one or more other oscillators 275, the operational frequency different from an operational frequency set for the internal oscillator 260. The circuit 200-*a* may be used as a clock generator 270, and the generated clock speed may be a function of the operational frequency of the second oscillator or oscillators 275.

The download state machine 265 may be configured to act as master controlling the communication of nonvolatile memory 205 to volatile registers bank 215 during the transfer of configuration data. The download state machine 265 may generate the communication starting data transfer at the serial-data (SDA) terminal 202 and sourcing the serial-clock (SCLK) terminal 204. In one embodiment, the download state machine 265 generates the clock signal for the serial-clock (SCLK) terminal 204 out of its own state clock with an F/2 ratio. As noted, the download state machine 265 clock comes from internal oscillator 260. The default frequency of the internal oscillator 260 may be set by the data existing in the internal oscillator speed control register 250 at power-up (before calibration data is transferred). Thus, the download state machine 265 initially operates at the default frequency, but may initiate the accelerated transfer speed and operate at the accelerated frequency according to the transferred calibration data.

The download state machine 265 may, for example, have the following states:

START State: A send "Start command" may initiate the communication. If the download state machine 265 does not receive acknowledgement (ACK) from nonvolatile memory 205, even if nonvolatile memory 205 exists signal is HIGH, the download state machine 265 repeats this state again and again until it receives an ACK. If the download state machine 265 receives an ACK, then it goes to COMMAND_CODE state. If nonvolatile memory 205 exists signal is LOW, it goes to NORMAL_MODE state. If TEST_MODE signal is high (internally), then it goes to TEST_MODE state directly.

COMMAND_CODE State: Once an ACK is received from the nonvolatile memory 205, the download state machine 265 sends a COMMAND_CODE (e.g., via serial data 202 and clock 204 lines) that identifies from which byte (or register number) download will start. It is by default Byte0 or Register0 (which stores the calibration data). If nonvolatile memory 205 receives this command and sends an ACK, the download state machine 265 transitions DOWNLOAD state. If no ACK is received, it starts from Start State again.

DOWNLOAD State: In this state the data transfer from nonvolatile memory 205 to volatile registers bank 215 occurs. It may continue until all bytes are transferred to volatile registers bank 215. Once transfer is completed (and the last byte is written) download state machine 265 sends a STOP signal and goes and stays at NORMAL_MODE state.

NORMAL_MODE State: The download state machine 265 shuts off the internal oscillator 260 (and therefore the state machine 265 itself).

TEST_MODE State: If the nonvolatile memory 205 is not programmed at all. In order to prevent downloading junk data from nonvolatile memory 205 to volatile registers bank 215, a Test Mode signal may be provided during power-up (before download starts). Since this signal is HIGH, download state machine 265 comes to TEST_MODE state, and DOWNLOAD does not happen. The download state machine 265 is, in effect, idle but nonvolatile memory 205 is accessible for programming.

There may be other states, such as: (1) Verification State: a download state machine 265 just downloads the first couple of bytes and those bytes may be compared with a hardware decoded content to verify the download is functioning properly or nonvolatile memory 205 is already programmed; or (2) Emulation State: If nonvolatile memory 205 exist signal is LOW, but it is desired to keep power-up time low or constant, an emulate state may be defined where download state machine 265 goes to that state and waits there the amount of download time as if download really happened, and then jumps to NORMAL_STATE. Even if there was no downloading, the power-up time may therefore remain substantially the same.

Thus, the programmable aspects of the download state machine 265 may be: (1) the state machine clock generated from internal oscillator 260 (programmable from the calibration data setting the accelerated speed), and the serial clock 204 for nonvolatile memory 205 is also generated by download state machine 260, this clock is programmable too; or (2) the number of bytes to be downloaded from nonvolatile memory 205 to volatile registers bank 215 is also programmable. Within programming bytes, there may be one or more bytes that contains the Byte# with which the Download should stop (the last Byte to be downloaded). The preceding description is only one example configuration; a variety of other serial and parallel configurations may be used, as evident to those skilled in the art.

Figure 2B:
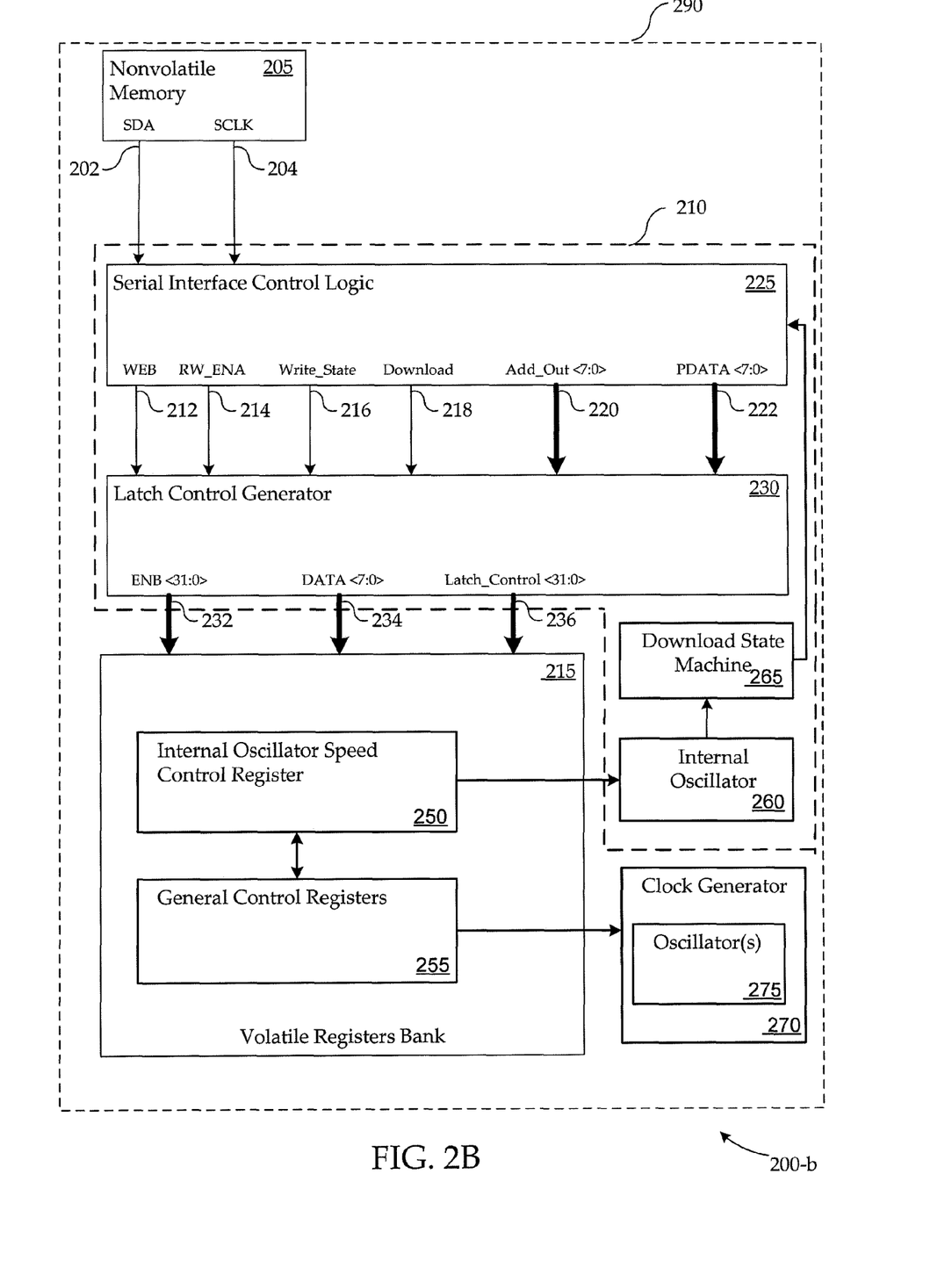

Turning next to FIG. 2B, a block diagram is shown illustrating an alternative example circuit configuration 200-b that provides for sequenced transfer of configuration data according to various embodiments of the present invention. In the illustrated embodiment, the nonvolatile memory array 205, control module components 210, and volatile register bank 215 reside on a single semiconductor substrate 290. In continuation, remaining circuit elements and their coupling to one another remain essentially as represented above in FIG. 2A. A number of other configurations may be used, as well.

Figure 3:
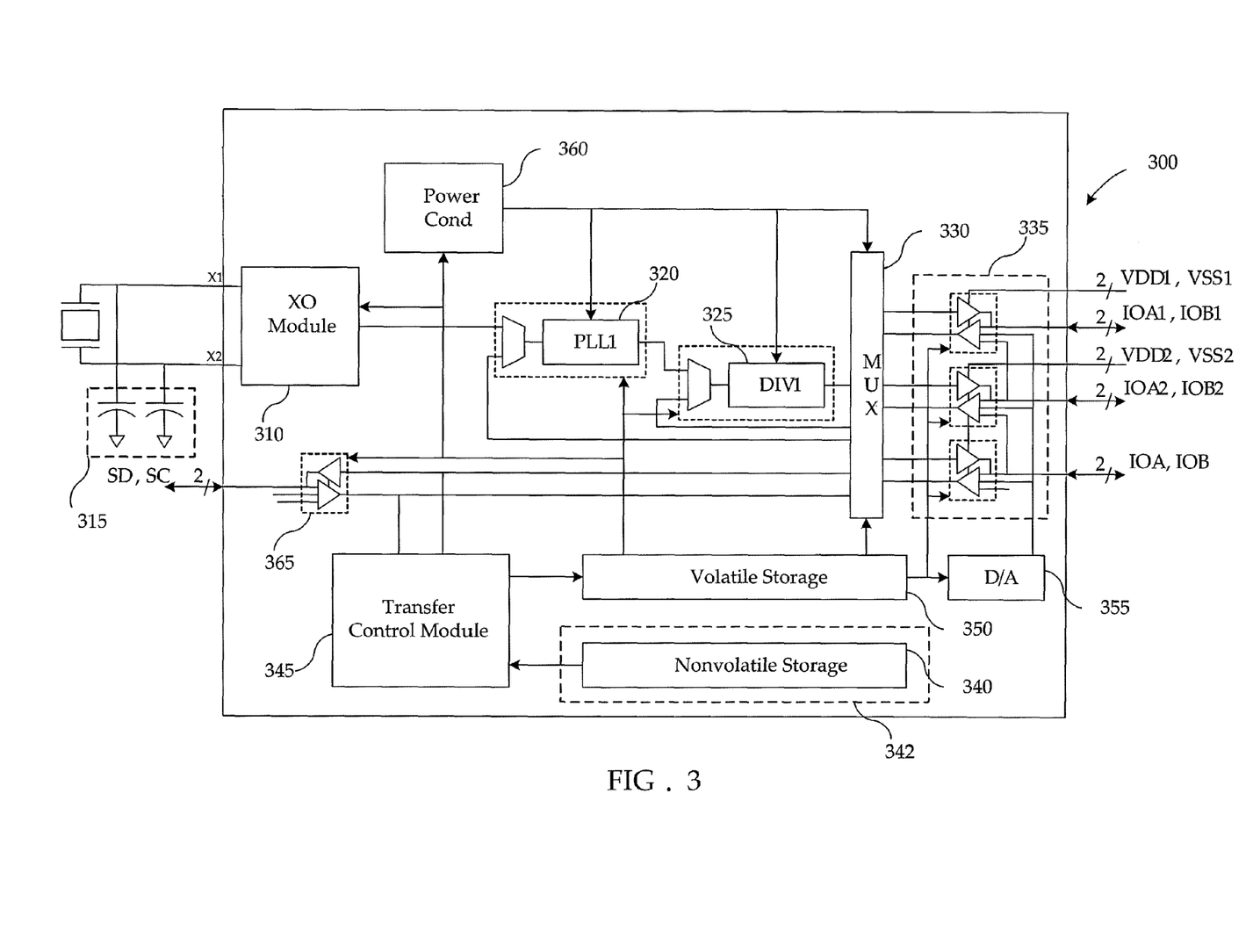
FIG. 3 is a block diagram illustrating an example clock generator architecture according to various embodiments of the present invention.

FIG. 3 illustrates a simplified block diagram of a clock generator 300 with calibrated transfer rate functionality, according to various embodiments of the invention. The clock generator 300 includes a crystal oscillator module 310. A pair of capacitors 315 connect crystal oscillator inputs X1, X2 to ground.

An output of the crystal oscillator module 310 is connected with an input multiplexer (mux) of a phase lock loop (PLL1) 320, providing a reference signal for the PLL. In other embodiments, additional PLLs may be used to allow for additional I/Os and further programmability. An output of the phase lock loop 320 is connected with an input multiplexer (mux) of a PLL divider (DIV1) 325. An output of the PLL divider 325 is fed to a MUX 330. A first set of outputs of the MUX 330 couples to programmable input/output buffers 335.

It will be further appreciated that embodiments of each instance of the programmable input/output buffers 335 (shown as a dashed box) implement two programmable I/O buffers. As shown, a first set of bidirectional (input/output) connections IOA1, IOB1 is powered by a first set of output buffer power supply terminals VDD1,VSS1; a second set of bi-directional (input/output) connections IOA2, IOB2 is powered by a second set of output buffer power supply terminals VDD2,VSS2; and a third set of bi-directional (input/output) connections IOA, IOB is powered by the second set of output buffer power supply terminals VDD2,VSS2. Terminals IOA, IOB, IOA1, IOB1, IOA2, and IOB2 provide interfaces to six programmable I/O buffers. In other embodiments, there may be more, or fewer, programmable I/O buffers.

The clock generator 300 also includes nonvolatile storage array 340, which may be fabricated, for example, in a single monolithic semiconductor substrate or alternately, the nonvolatile storage array 340 may reside on a second semiconductor substrate 342. This may be the nonvolatile memory 105, 205 of FIG. 1A, 1B, 2A, or 2B. The nonvolatile storage array 340 is in communication with a transfer control module 345 (which may, for example, be the control module 110, 210 of FIG. 1A, 1B, 2A, or 2B). The transfer control module 345 is also connected with volatile storage array 350 (which may be the volatile memory 115, 215 of FIG. 1A, 1B, 2A, or 2B).

The volatile storage array 350 is in communication with a digital-to-analog (d/a) block 355, a power conditioner block 360, a serial I/O (SIO) block 365, the programmable input/output buffers 335, the mux 330, the PLL 320, the PLL divider 325, and the crystal oscillator module 310. The SIO block 365 couples to serial data and serial clock inputs SD,SC, the transfer control module 345, and the mux 330. The power conditioner block 360 is coupled to PLL power inputs. The SIO block 365 may be fabricated appropriately to requirements established by serial protocols, such as, for example, the inter-integrated circuit (I2C) bus.

Sets of calibration data and configuration data may be maintained in the nonvolatile storage array 340 and made available to configure the programmable input/output buffers 335 at system power-up through the transfer control module 345. The transfer control module 345 may transfer sets of configuration data from the nonvolatile storage array 340 to the volatile storage array 350 in the following order (although other sequencing orders may be used in other embodiments), and operation of each circuit element may begin after the set of configuration data is received at the volatile storage array 350. In one embodiment, a set of calibration data is transferred first at a default speed. The calibration data may be used to set an accelerated speed for future transfers from the nonvolatile storage array 340 to the volatile storage array 350. The remaining transfers may then occur at the accelerated speed. A set of configuration data for a power conditioner block 360 is transferred next. Operation of power conditioner block 360 is initiated upon completion of the transfer of the set of power conditioner block 360 configuration data, while remaining transfers continue. Next, a set of configuration data for a crystal oscillator module 310 is transferred after the power conditioner configuration data. Operation of the crystal oscillator module 310 is initiated upon completion of the transfer of the set of crystal oscillator module 310 configuration data, while remaining transfers continue.

Next, a set of configuration data for analog aspects of PLL 320 is transferred. Operation of PLL 320 analog elements may be initiated upon completion of the transfer of the analog PLL 320 configuration data, while remaining transfers continue. A set of configuration data for divide by logic in of PLL divider 325 is transferred after the analog PLL configuration data. Operation of PLL divider 325 may be initiated upon completion of the transfer of the digital PLL configuration data, while remaining transfers continue. Next, one or more sets of configuration data for programmable input/output buffers 335 is transferred. The operation of the programmable input/output buffers 335 is initiated upon completion of the transfer of the I/O configuration data (perhaps on a per I/O buffer basis, as respective sets of data are received), while the remaining transfer continues. A set of configuration data PLL spread spectrum may be transferred after the I/O configuration data. The preceding description is for purposes of example only, and other sequences in the same or other types of circuits may be used.

Figure 4:
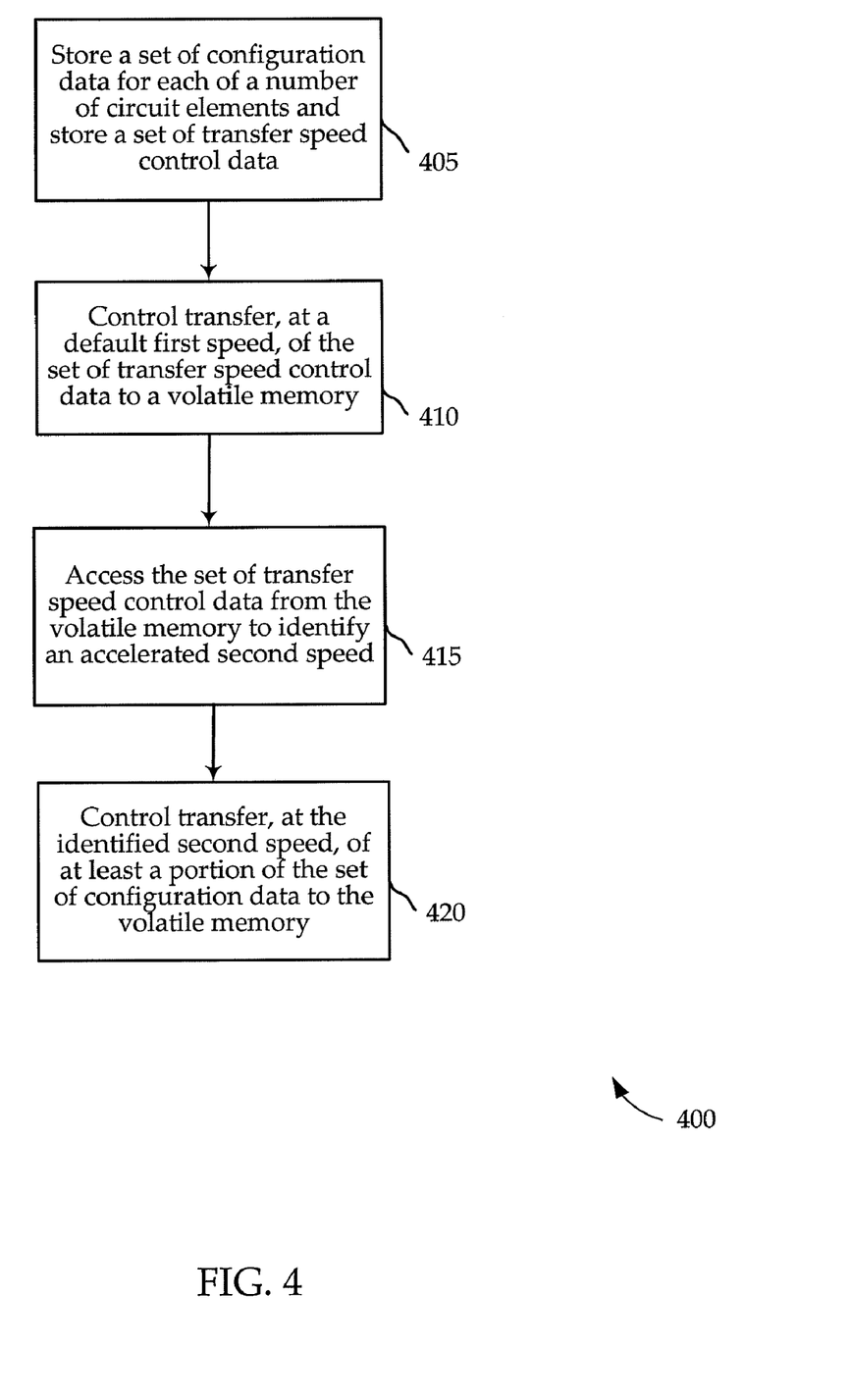
FIG. 4 is a flowchart illustrating a method for controlling the transfer speed of configuration data according to various embodiments of the invention.

FIG. 4 is a flowchart illustrating a method 400 for controlling the transfer speed of configuration data according to various embodiments of the invention. The method 400 may, for example, be performed in whole or in part using the configuration of FIG. 1A or 1B, the configuration circuit 200 of FIG. 2A or 2B, or the clock generator 300 of FIG. 3.

At block 405, a set of configuration data for each of a number of circuit elements and a set of transfer speed control data are stored. At block 410, the set of transfer speed control data is transferred to a volatile memory at a default first speed. At block 415, the set of transfer speed control data is accessed from the volatile memory to identify an accelerated second speed. At block 420, at least a portion of the set of configuration data is transferred to the volatile memory at the accelerated second speed.

Figure 5:
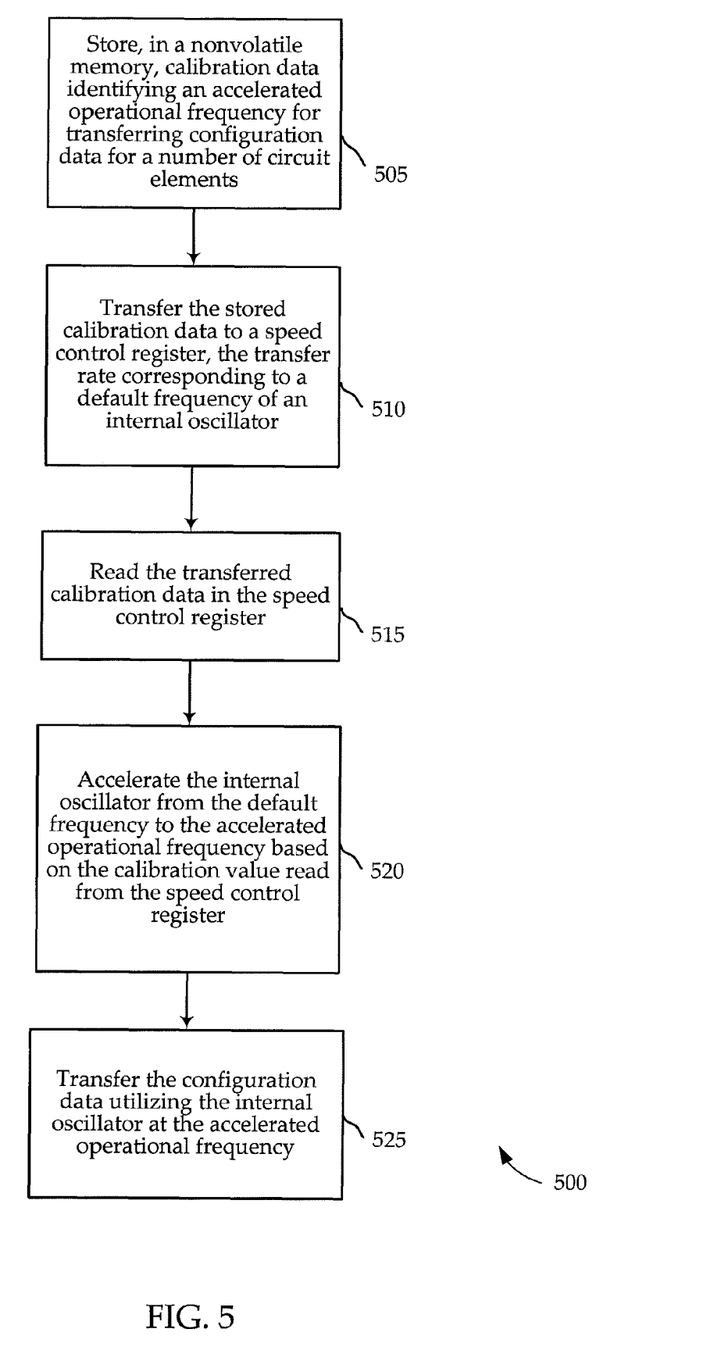
FIG. 5 is a flowchart illustrating a method for controlling the operational frequency of an oscillator according to various embodiments of the invention.

FIG. 5 is a flowchart illustrating a method 500 for controlling the operational frequency of an oscillator according to various embodiments of the invention. The method 500 may, for example, be performed in whole or in part using the configuration of FIG. 1A or 1B, the configuration circuit 200 of FIG. 2A or 2B, or the clock generator 300 of FIG. 3.

At block 505, calibration data is stored in nonvolatile memory, the calibration data identifying an accelerated operational frequency for the transfer of configuration data for a number of circuit elements. At block 510, the stored calibration data is transferred to a speed control register at a rate corresponding to a default frequency of an internal oscillator. At block 515, the transferred calibration data is read from the speed control register. At block 520, the internal oscillator is accelerated from the default frequency to the accelerated operational frequency based on the calibration value read from the speed control register. At block 525, the configuration data is transferred utilizing the internal oscillator at the accelerated operational frequency.

Figure 6:
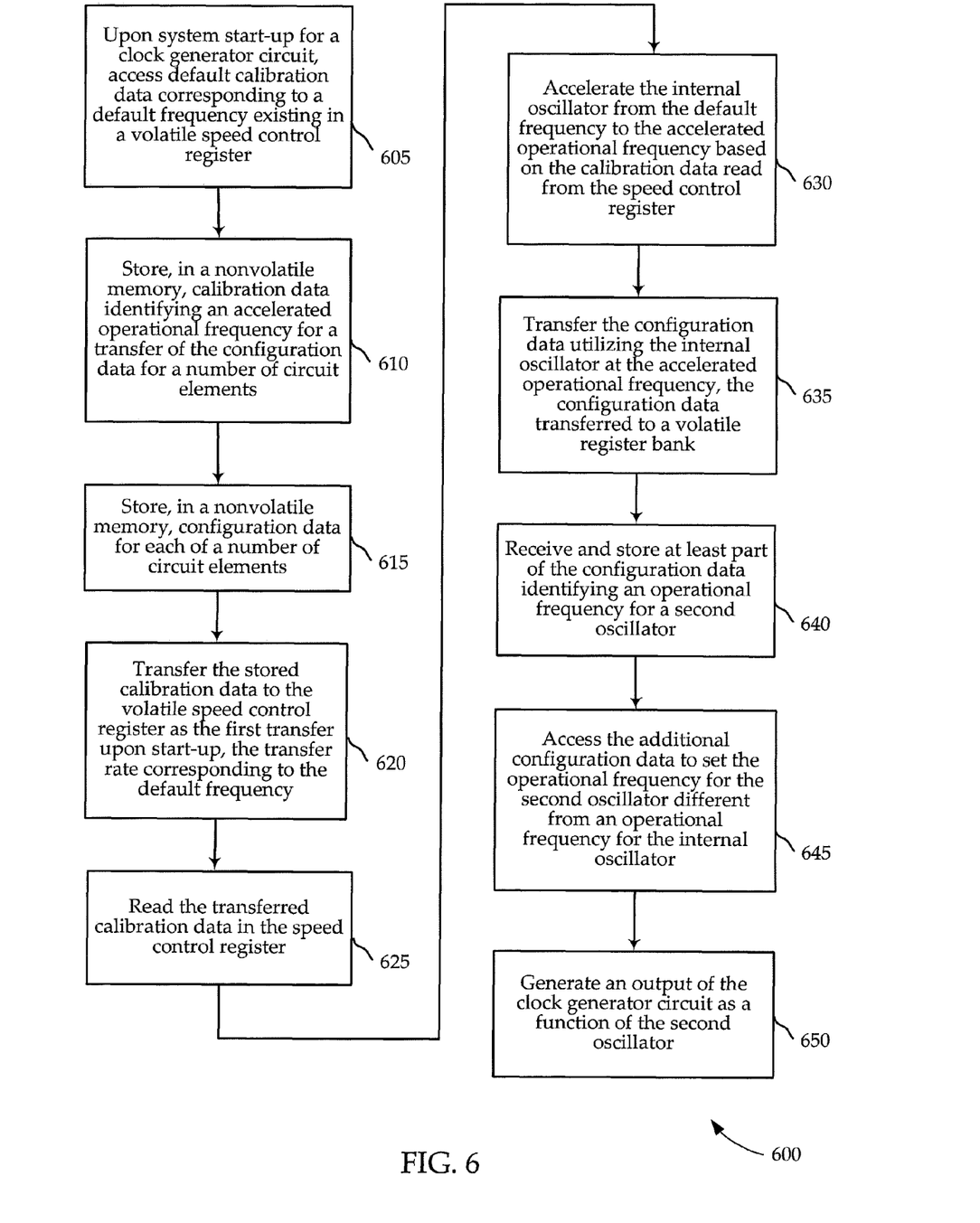
FIG. 6 is a flowchart illustrating a method for controlling the transfer configuration data from a nonvolatile memory array to a volatile registers bank at system start-up for a clock generator according to various embodiments of the invention.

FIG. 6 is a flowchart illustrating a method 600 for transferring configuration data from a nonvolatile memory array to a volatile registers bank at system start-up for a clock generator according to various embodiments of the invention. The method 600 may, for example, be performed in whole or in part using configuration of FIG. 1A or 1B, the configuration circuit 200 of FIG. 2A or 2B, or the clock generator 300 of FIG. 3.

Default calibration data corresponding to a default frequency exists in a volatile speed control register of a clock generator circuit. At block 605, upon system power-up, the default calibration data is accessed to identify the default frequency. At block 610, calibration data identifying an accelerated operational frequency for the transfer of configuration data is stored in a nonvolatile memory. At block 615, a set of configuration data for a number of circuit elements is stored in the nonvolatile memory.

At block 620, the stored calibration data is transferred from the nonvolatile memory to the volatile speed control register as the first transfer upon power-up, the transfer rate corresponding to the default frequency. At block 625, the transferred calibration data in the speed control register is read. At block 630, the internal oscillator is accelerated from the default frequency to the accelerated operational frequency based on the calibration data read from the speed control register.

At block 635, the configuration data is transferred to a volatile register bank utilizing the internal oscillator operating at the accelerated operational frequency. At block 640, a configuration data identifying an operational frequency for a second oscillator is received and stored. At block 645, the additional configuration data is accessed to set the operational frequency for the second oscillator different from the operational frequency for the internal oscillator. At block 650, the output of the clock generator circuit is generated as a function of the second oscillator.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A circuit comprising:
a nonvolatile memory configured to store calibration data identifying an accelerated operational frequency for a transfer of data;
a speed control register, communicatively coupled with the nonvolatile memory, and configured to receive and store the calibration data transferred from the nonvolatile memory;
a control module, communicatively coupled with the speed control register and an internal oscillator, and configured to:
access the calibration data identifying the accelerated operational frequency from the speed control register; and
control the internal oscillator to accelerate from a default operational frequency to the accelerated operational frequency according to the accessed calibration data; and
the internal oscillator configured to:
operate at the default operational frequency for the transfer of the calibration data identifying the accelerated operational frequency from the nonvolatile memory to the speed control register; and
operate at the accelerated operational frequency for transfer of additional configuration data.

2. The circuit of claim 1, wherein the control module further comprises a download state machine configured to programmably establish an operational frequency of the internal oscillator.

3. The circuit of claim 2, wherein the calibration data is provided from the speed control register to the download state machine, the download state machine initiating the accelerated operational frequency in the internal oscillator.

4. The circuit of claim 1, wherein the calibration data is transferred to the speed control register during system power-up.

5. The circuit of claim 4, wherein transferring the calibration data comprises transfer of data from the nonvolatile memory during system power-up.

6. The circuit of claim 1, wherein default calibration data corresponding to the default operational frequency exists in the speed control register upon system power-up and before the transfer of the calibration data corresponding to the accelerated operational frequency.

7. The circuit of claim 1, further comprising:
a second oscillator, communicatively coupled with the control module, and configured to access the additional configuration data to receive an operational frequency different from an operational frequency for the internal oscillator.

8. The circuit of claim 7, further comprising:
a volatile register bank, communicatively coupled with the nonvolatile memory, and configured to:
receive and store the additional configuration data transferred from the nonvolatile memory utilizing the accelerated operational frequency; and
provide access to the additional configuration data to set the operational frequency of the second oscillator.

9. The circuit of claim 8, wherein,
the circuit comprises a clock generator circuit; and
a generated clock speed of the clock generator circuit is a function of the operational frequency of the second oscillator.

10. A method comprising:
storing, in a memory module, calibration data identifying an accelerated operational frequency for a transfer of configuration data;
transferring the stored calibration data to a speed control register at a rate corresponding to a default operational frequency of an internal oscillator;
reading the transferred calibration data in the speed control register;
accelerating the internal oscillator from the default operational frequency to the accelerated operational frequency based on the calibration data read from the speed control register; and
transferring the configuration data utilizing the internal oscillator at the accelerated operational frequency.

11. The method of claim 10, wherein a download state machine receives the calibration data from the speed control register to programmably establish the accelerated operational frequency of the internal oscillator.

12. The method of claim 10, wherein the transferring of data from the memory module commences with the calibration data.

13. The method of claim 10, wherein default calibration data corresponding to the default operational frequency exists in the speed control register upon system power-up and before the transfer of the calibration data corresponding to the accelerated operational frequency.

14. The method of claim 10, further comprising:
accessing the transferred configuration data to receive a setting for an operational frequency for a second oscillator different from an operational frequency for the internal oscillator,
wherein the memory module comprises nonvolatile memory storing the configuration data before the transfer of the configuration data.

15. The method of claim 14, further comprising:
generating a clock as a function of the operational frequency of the second oscillator.

16. A circuit for configuring circuit elements, the circuit comprising:
a memory module configured to store a set of configuration data for each of a plurality of circuit elements and to store a set of transfer speed control data;
a control module, communicatively coupled with the memory module and a volatile memory, and configured to:
control transfer, at a default first speed, of the set of transfer speed control data from the memory module to the volatile memory;
access the set of transfer speed control data from the volatile memory to identify an accelerated second speed; and
control transfer, at the accelerated second speed, of at least a portion of the set of configuration data; and
the volatile memory, configured to be communicatively coupled with each of the plurality of circuit elements, and configured to:
receive and store the set of transfer speed control data from the volatile memory; and receive and store the set of configuration data transferred from the memory module at the accelerated speed according to the transfer speed control data stored in the volatile memory.

17. The circuit of claim 16, wherein the control module further comprises a download state machine configured to programmably establish an operational frequency of an internal oscillator.

18. The circuit of claim 17, wherein the set of transfer speed control data comprises calibration data provided from the volatile memory to the download state machine, the download state machine initiating the accelerated second speed according to the calibration data.

19. The circuit of claim 16, wherein the set of transfer speed control data is transferred to the volatile memory during system power-up.

20. The circuit of claim 16, wherein transferring the set of transfer speed control data comprises transfer of data from the memory module during system power-up.

21. The circuit of claim 16, wherein a default set of default transfer speed control data corresponding to the default first speed exists in the volatile memory upon system power-up and before the transfer of the set of transfer speed control data corresponding to the accelerated speed.

22. The circuit of claim 16, further comprising:
a first oscillator, communicatively coupled with the control module and volatile memory, the first oscillator at least in part controlling the transfer speed; and
a second oscillator, communicatively coupled with the control module and volatile memory, and configured to access the set of configuration data to receive an operational frequency different from an operational frequency for the first oscillator.

23. The circuit of claim 22, wherein,
the circuit comprises a clock generator circuit;
a generated clock speed of the clock generator circuit is a function of the operational frequency of the second oscillator;
the memory module comprises nonvolatile memory;
the set of transfer speed control data comprises calibration data; and
the volatile memory comprises a speed control register.

* * * * *